(12) United States Patent
Hong et al.

(10) Patent No.: US 6,775,105 B2
(45) Date of Patent: Aug. 10, 2004

(54) PURE TORQUE VOICE COIL MOTOR

(75) Inventors: Yiren Hong, Singapore (SG); Tak Koon Ooi, Singapore (SG); ChorShan Cheng, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 217 days.

(21) Appl. No.: 09/888,988

(22) Filed: Jun. 25, 2001

(65) Prior Publication Data

US 2002/0036867 A1 Mar. 28, 2002

Related U.S. Application Data

(60) Provisional application No. 60/235,607, filed on Sep. 27, 2000.

(51) Int. Cl.[7] .............................................. G11B 21/08
(52) U.S. Cl. .................................................... 360/264.7
(58) Field of Search ............................. 360/264–264.7, 360/265, 266, 256.2; 310/154

(56) References Cited

U.S. PATENT DOCUMENTS

| | | |
|---|---|---|
| 4,775,908 A | 10/1988 | Ycas |
| 5,005,095 A | 4/1991 | Wagner |
| 5,051,669 A | 9/1991 | Hsiao et al. |
| 5,122,702 A | 6/1992 | Nakazato |
| 5,267,110 A | 11/1993 | Ottesen et al. |
| 5,329,267 A * | 7/1994 | Endoh et al. |
| 5,448,437 A * | 9/1995 | Katahara |
| 5,475,549 A | 12/1995 | Marder et al. |
| 5,523,911 A * | 6/1996 | Mita et al. |
| 5,602,701 A | 2/1997 | Komura et al. |
| 5,666,244 A | 9/1997 | Ogawa |
| 5,698,911 A | 12/1997 | Dunfield et al. |
| 5,768,061 A | 6/1998 | Casey et al. |
| 5,768,063 A | 6/1998 | Suwa et al. |
| 6,005,747 A | 12/1999 | Gilovich |
| 6,226,156 B1 * | 5/2001 | Kasetty et al. .............. 360/265 |

* cited by examiner

Primary Examiner—Allen Cao
(74) Attorney, Agent, or Firm—Derek J. Berger

(57) ABSTRACT

In a disc drive, a voice coil motor is configured to drive an actuator with mainly torque, thereby reducing unwanted vibration of the actuator. The voice coil motor includes a moving coil vertically disposed with respect to a horizontal radial magnetic field provided by a stationary unipolar magnet such that the active portions of the coil are of different radial separation from the actuator pivot. A yoke facilitates closure of the magnetic flux paths.

22 Claims, 7 Drawing Sheets

PURE TORQUE VOICE COIL MOTOR

RELATED APPLICATIONS

This application claims the benefit of U.S. Provisional Application No. 60/235,607, filed Sep. 27, 2000.

FIELD OF THE INVENTION

The present invention relates generally to data storage devices. More particularly, the present invention relates to voice coil motors for effecting movement of disc drive actuators.

BACKGROUND OF THE INVENTION

A typical disc drive comes with discs on which data can be recorded. Read/write devices for recording data and for reading back stored data are supported by an actuator for movement across the surfaces of the discs. Rotary actuators which can be caused to rotate about a pivot by a voice coil motor are often chosen for use in today's disc drives. Basically, the voice coil motor is made up of a coil of wire located near a magnet which generates a magnetic field. When a current is passed through the coil, the coil interacts with magnetic field so as to effect motion of the coil relative to the magnet.

Various voice coil motor designs have been proposed over the years. For example, some have produced voice coil motors of a type where the coil is coupled to the actuator such that the coil is perpendicular to a plane of rotation of the actuator. The coil is situated between two magnets which have like poles facing each other. When the coil is activated by a passing current, torque is generated in the same direction by the two portions of the coil that are parallel to the plane of rotation, resulting in the rotation of the actuator.

Others have used a bipolar magnet, in which the magnet has a direction of magnetization that is substantially perpendicular to its major surfaces. In these arrangements, half of the magnet has a front-to-back north-south magnetization and the other half has a back-to-front north-south magnetization. The coil is arranged so as to be perpendicular to the plane of rotation of the actuator and parallel to the plane of the major surfaces of the magnets.

Still others have arranged bipolar magnets with their major surfaces parallel to the plane of rotation with a coil which is also parallel to the plane of rotation. The active portions of the coil are again subject to magnetic fields of opposite direction so that torque is generated in the same direction by both active portions of the coil to move the actuator.

Different problems associated with the performance of the voice coil motor have been experienced in the prior art, including issues such as the linearization of the torque-to-angular displacement curve, and the improvement of torque constant to moment of inertia ratio. Room for improvement remains, and consideration needs to be given to factors such as cost and ease of manufacture. One problem to which a viable solution remains wanting is the contribution of the voice coil motor to the vibration of the actuator, which in turn has a significant impact on the performance of the disc drive.

What the prior art has been lacking is a voice coil motor which addresses these problems while maintaining low cost and ease of manufacture.

SUMMARY OF THE INVENTION

The present invention relates to an improved voice coil motor that provides mainly torque on an associated actuator intended for use in a disc drive.

In accordance with one embodiment of the invention, two lengths of a wire coupled to the actuator and configured to carry current in opposite directions are in perpendicular arrangement in magnetic field of the same direction. The magnetic fields are substantially the same. Both lengths of the wire are situated in magnetic fields having the same direction. The lengths of wire are of different radial distance from the pivot about which the actuator is designed to rotate.

These and various other features as well as advantages which characterize the present invention will be apparent upon reading of the following detailed description and review of the associated drawings.

DETAILED DESCRIPTION

Figure 1:
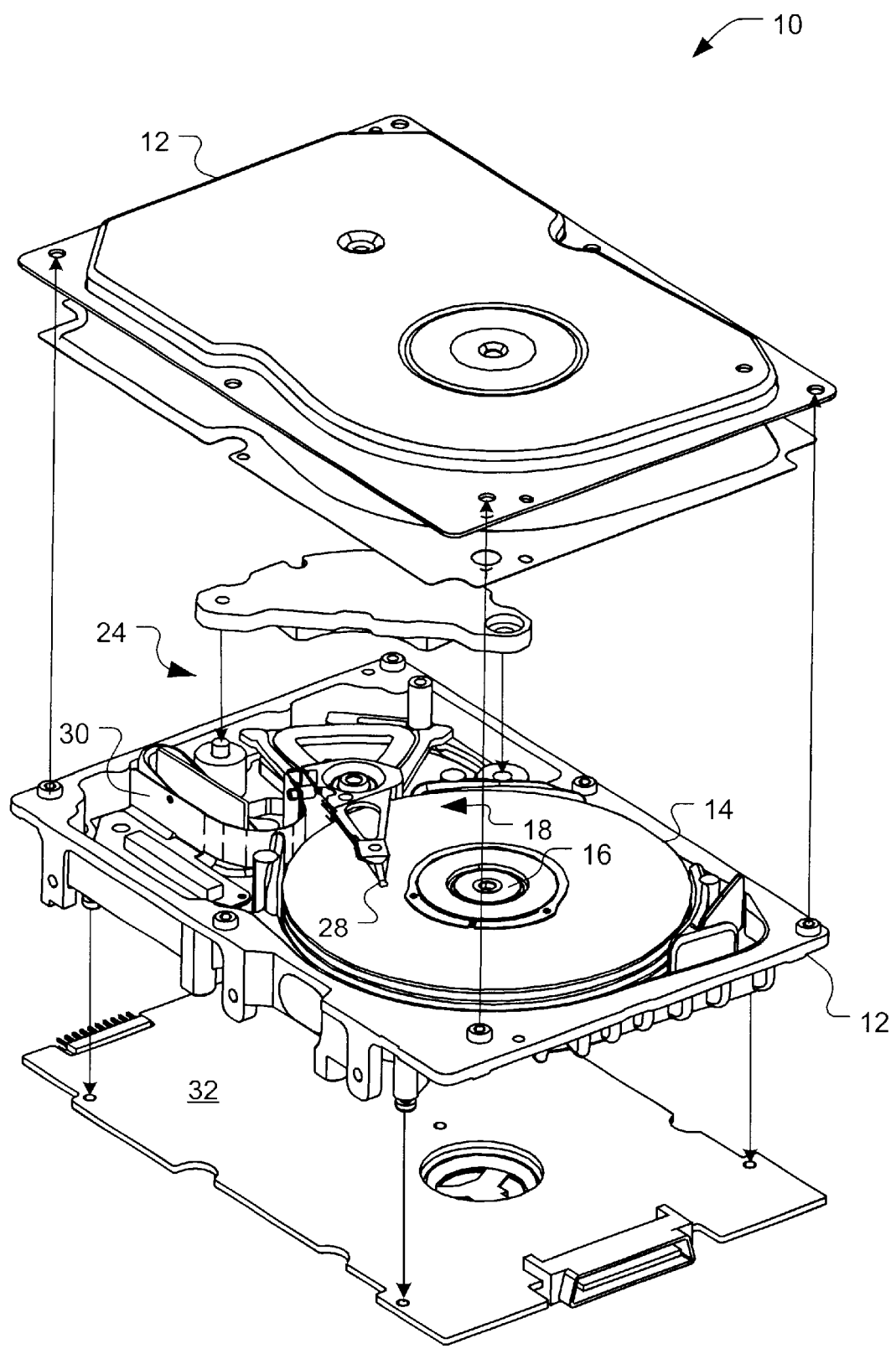
FIG. 1 is a perspective view of a disc drive in which the present invention can be implemented.

FIG. 1 is a perspective view of an exemplary disc drive 10 in which the present invention can be implemented. Within the housing 12 which is shown here in parts, one or more discs 14 are rotated by a spindle motor 16. Each disc 14 is formatted into a plurality of concentric tracks in which data can be recorded. An actuator 18 comprises an actuator body 20 and a plurality of actuator arms 22 extending from the actuator body 20. A motor 24, such as a voice coil motor, is operated to rotate the actuator 18 about an axis 26. Each actuator arm 22 supports at least one read/write head 28 adjacent a selected track. The read/write head 28 reads and/or writes data to the track on the disc surface opposite the read/write head 28. Rotation of the actuator 18 about the axis 26 causes the read/write head 28 to move along an arcuate path on the disc. The voice coil motor 24 is electrically connected, usually by means of a flexible printed circuit cable 30, to disc drive circuitry 32 controlling the positioning of the read/write head 28.

Figure 2:
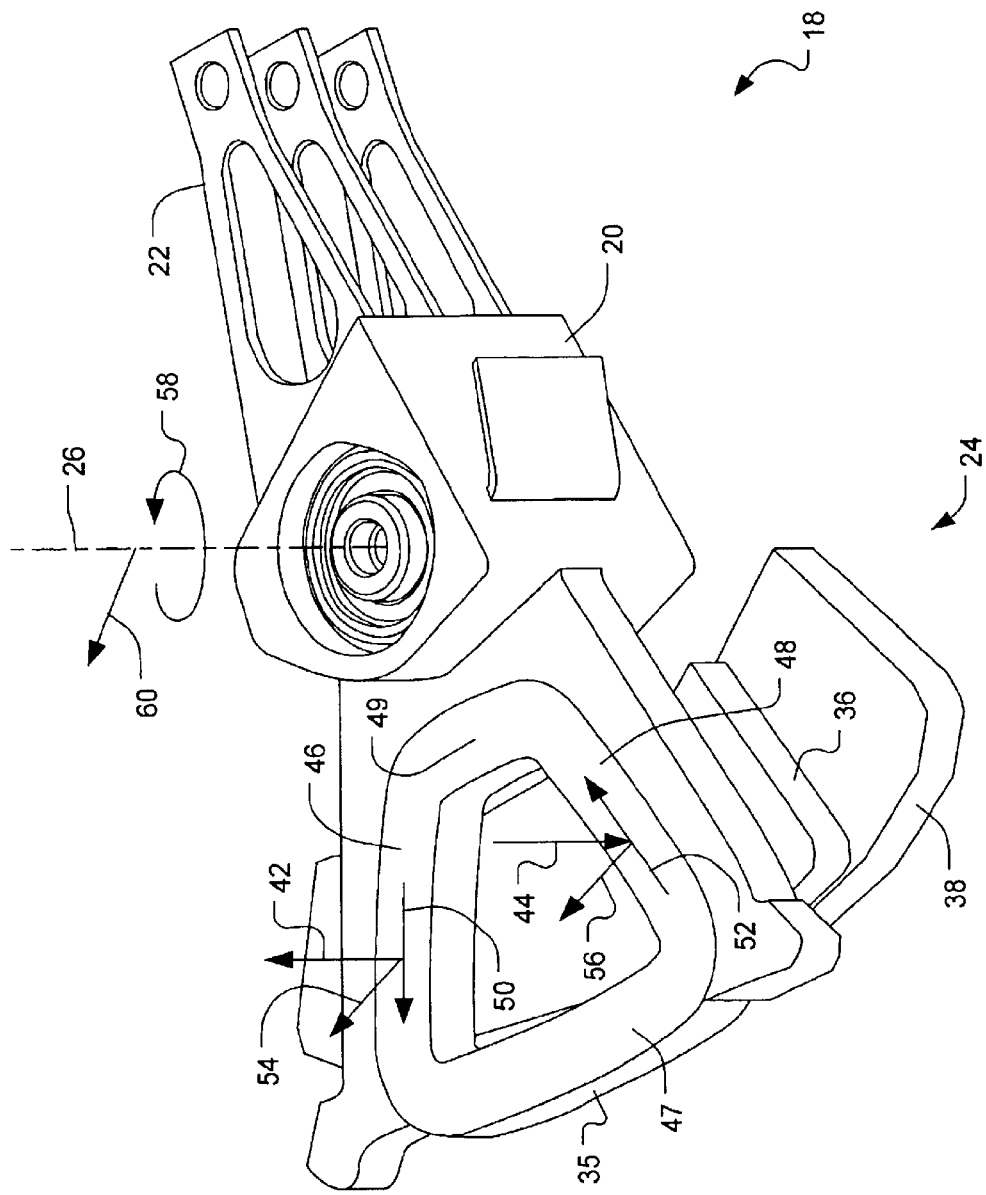
FIG. 2 is a perspective view of a conventional voice coil motor coupled to an actuator.

A conventional voice coil motor is described at this juncture to better illustrate the advantages of the present invention. FIG. 2 shows a conventional voice coil motor 34 that is coupled to an actuator 18 for use in a disc drive 10. For convenience, the plane of rotation of the actuator 18 will be referred to as a horizontal plane. The coil 35 is supported by the actuator 18 in a horizontal orientation. A bipolar magnet 36, adhered to a lower baseplate 38, is arranged under the coil 35. A corresponding bipolar magnet (not shown) is arranged above the coil such that unlike poles face each other. The magnetic field is therefore characterized by magnetic flux paths 42 that are directed vertically up on one side of the coil and by magnetic flux paths 44 that are directed vertically down on the other side of the coil, as shown by arrows 42, 44. The coil can be described in terms of four sides 46, 47, 48, 49. The active portions of the coil, in this arrangement, are the radially extending portions of the coil 46, 48. When a current is passed through the coil 35, for example, in the direction shown by arrows 50, 52, the electromotive forces generated will be in the directions as shown by arrows 54, 56. The active portions 46, 48, of the coil generate both a torque 58 and a resultant side-pull force 60 on the actuator 18.

Figure 3:
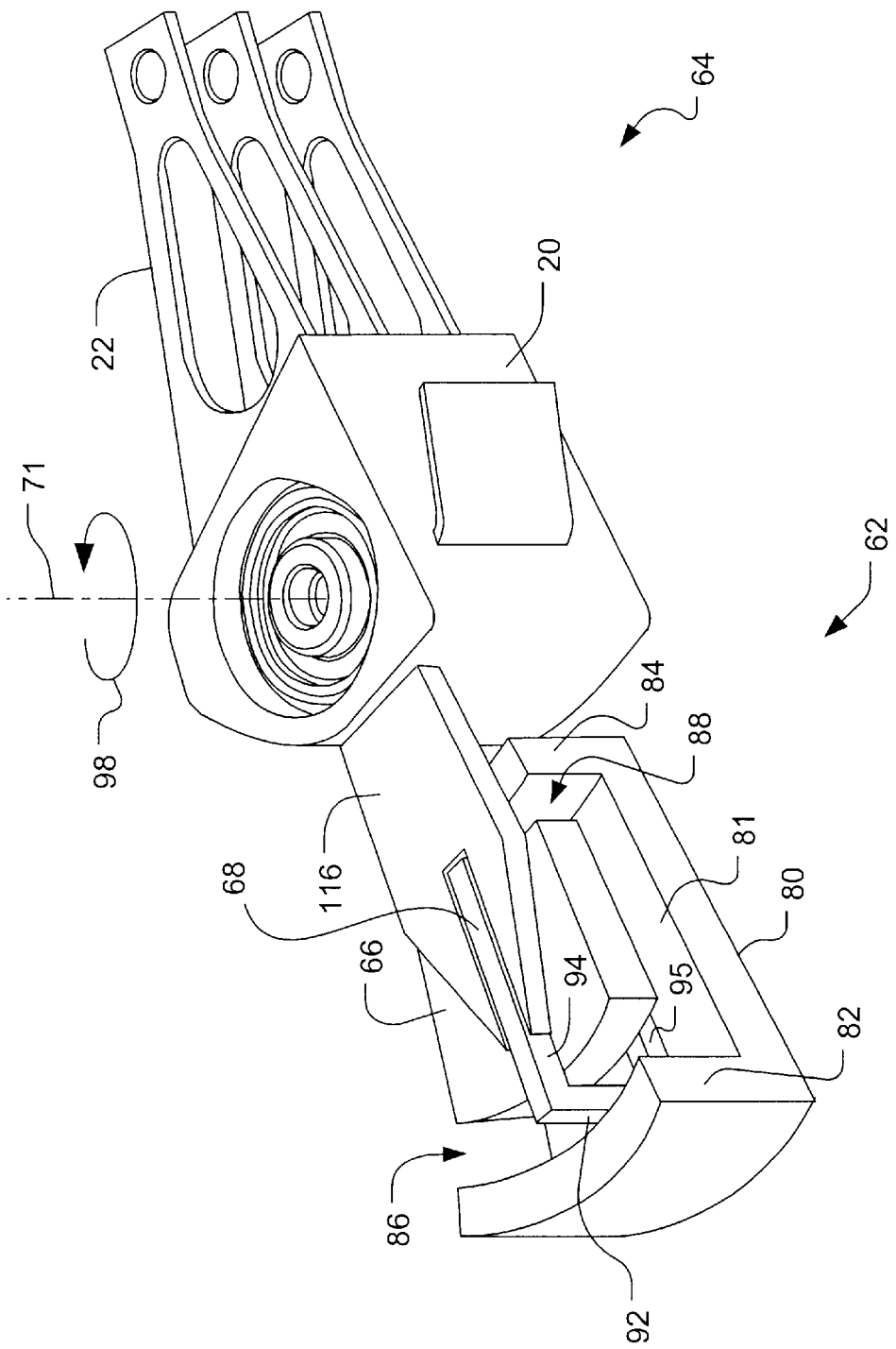
FIG. 3 is a perspective view of a voice coil motor coupled to an actuator, according to a most preferred embodiment of the present invention.

FIG. 3 is a perspective view of a voice coil motor 62 according to a preferred embodiment of the invention, further showing the voice coil motor 62 in association with an actuator 64 that is driven by the voice coil motor 62. The voice coil motor 62 comprises a magnetic field provided by a permanent magnet 66 fixedly mounted, directly or indirectly, to the disc drive housing 12. The coil 68, which also forms part of the voice coil motor 62, is fixed to the actuator 64. The actuator 64 itself is pivotally mounted to the disc drive housing 12 such that, when the coil 68 is energized by the passing of a current, the electromotive forces 69, 70, generated causes the actuator to rotate about its pivot 71.

The present invention allows for the use of a unipolar magnet 66, which is cheaper than a bipolar magnet required by some conventional voice coil motors. The magnet 66 is oriented with the magnetic flux paths 72, 74, directed radially away from the actuator pivot 71. In this embodiment, the magnet 66 is surrounded by the coil 68. The magnet 66 is shaped with opposing arcuate surfaces 76, 78. Under the magnet 66 is a yoke 80 in the shape of an arcuate trough 81 having a vertical first arm 82 and a vertical second arm 84 which define an inner air gap 86 and an outer air gap 88 with the magnet 66. The yoke 80 serves to close the magnetic flux paths 72, 74.

The coil 68 is shaped to provide two vertical portions 92, 93, that are spaced apart, at different radial distances from the actuator pivot 71. The other two portions 94, 95, of the coil extend in essentially radially from the actuator pivot 71. The upper radial portion 94 is secured to a support 116 that is fixed to the actuator 64.

Figure 4:
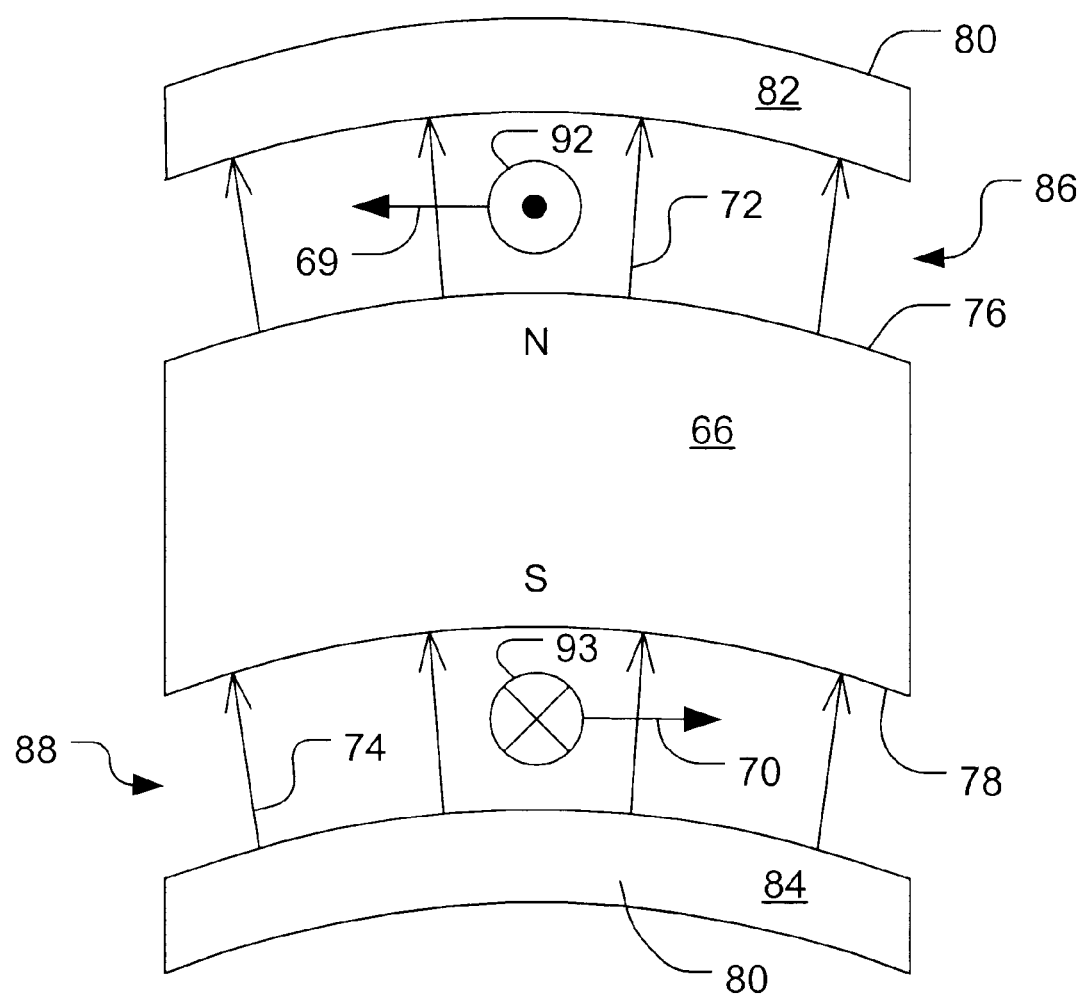
FIG. 4 is a schematic diagram showing the direction of the effective torque at the pivot of the actuator.
Figure 4:
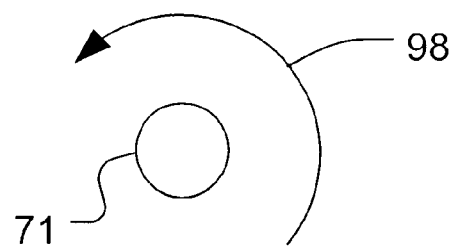

Making reference to FIG. 4, the two vertical portions 92, 93, which serve as the active portions of the coil are in magnetic fields that are characterized by the same magnetic flux density, with the magnetic flux paths 72, 74, in the same direction. In this example, the portion 92 of the coil further away from the pivot 71 carries the current in a direction 96 out of the paper, and the portion 93 nearer the pivot carries the same current in a direction into the paper. The electromotive forces 69, 70, generated at the two portions 92, 93, are therefore equal but opposite in direction. Translating the forces 69, 70, to the pivot 71, it will be understood that actuator 64 essentially experiences only torque 98, unlike conventional systems where there is a resultant side-pull force acting on the actuator. To rotate the actuator 64 in the opposite direction, the direction of the current is reversed.

Figure 5:
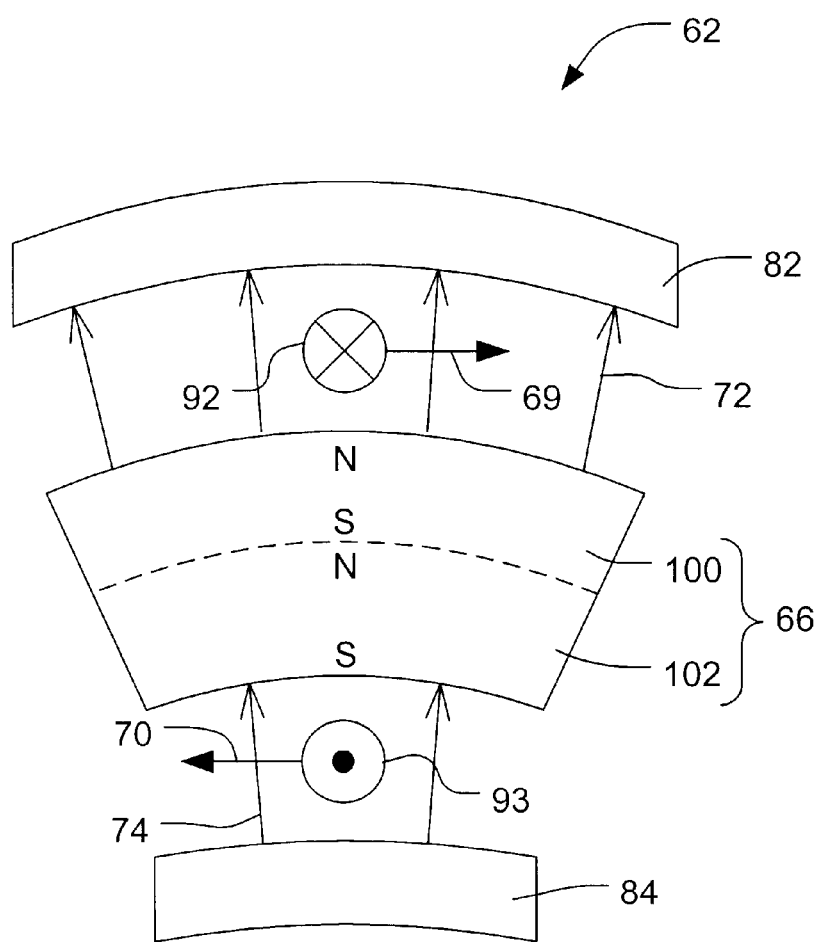
FIG. 5 is a schematic diagram showing an alternative embodiment of the present invention.

In this example, the magnet 66 is configured such that its proximal circumferential surface 78 and its distal circumferential surface 76 have essentially the same surface area and similar degree of curvature. In an alternative embodiment, as shown schematically in FIG. 5, the magnet 66 can be made from at least two different materials 100, 102 of different magnetic properties such that a different shape of the magnet 66 can still provide essentially the same magnetic field to both active portions 92, 93, of the coil 68. For the purpose of illustration, the coil 68 is shown carrying a current opposite in direction from that shown in FIG. 4. The resultant torque 98 on the actuator 64 is therefore in the opposite direction.

Figure 6:
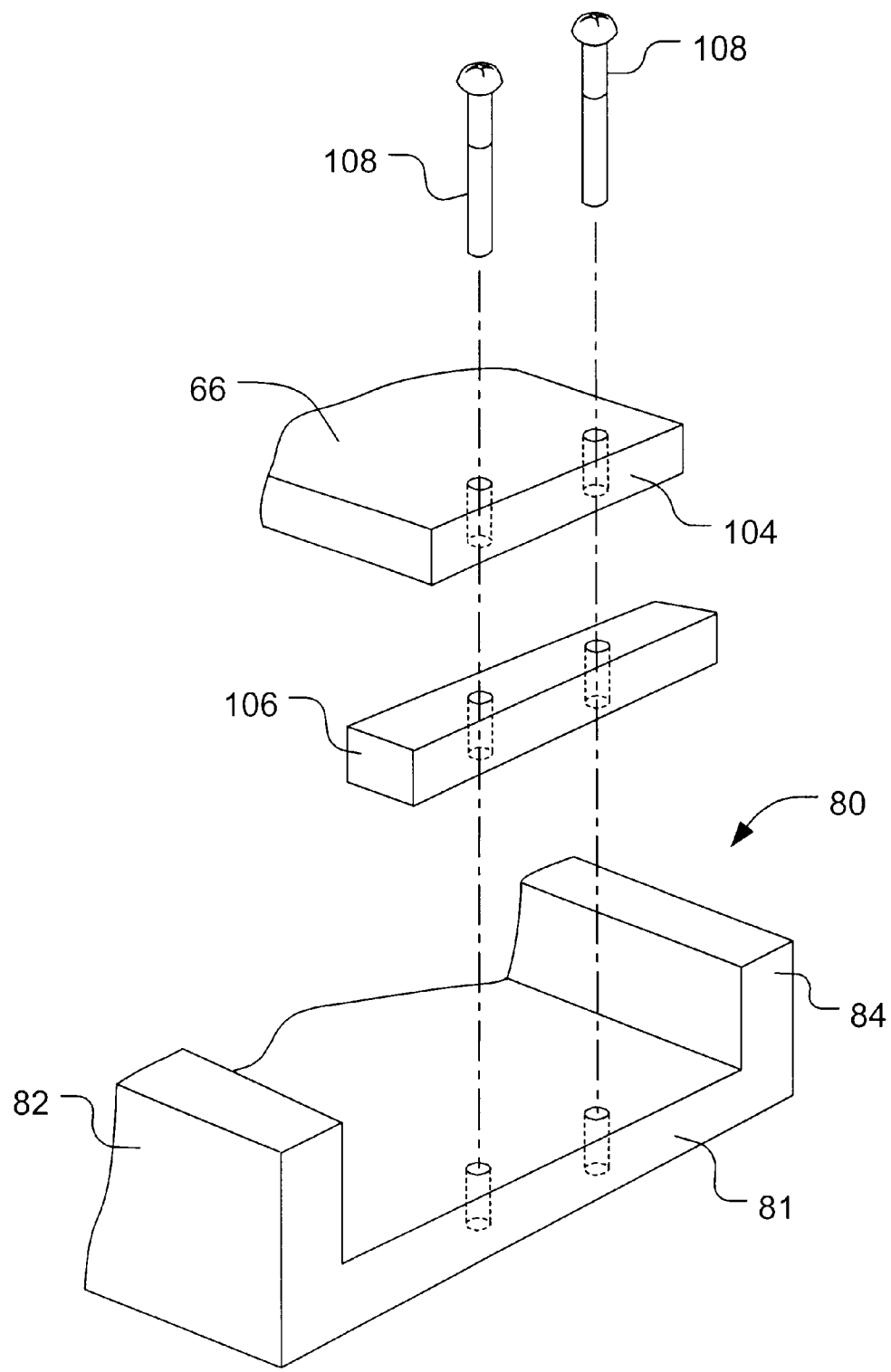
FIG. 6 is a partial view of the yoke of FIG. 3 showing an exemplary mounting arrangement for the magnet.

A yoke 80, preferably fabricated as a U-shape piece from stainless steel, is positioned under the magnet 66, with the coil 68 in its trough 81. By having arms 82, 84, that extend vertically to run beside the length of the active portions 92, 93, of the coil, the yoke 80 defines the air gaps 86, 88, in which the coil 68 moves and provides a non-air medium for closing the magnetic flux paths 72, 74. The magnet 66 may be supported at both of its ends 104 by vertical supports 106, as shown in FIG. 6. The magnet 66 is securely fastened in place by fasteners 108 such as screws to the vertical supports 106. The vertical supports 106 can be fastened to the yoke 80 which is in turn mounted to the housing 12 of the disc drive 10.

Figure 7:
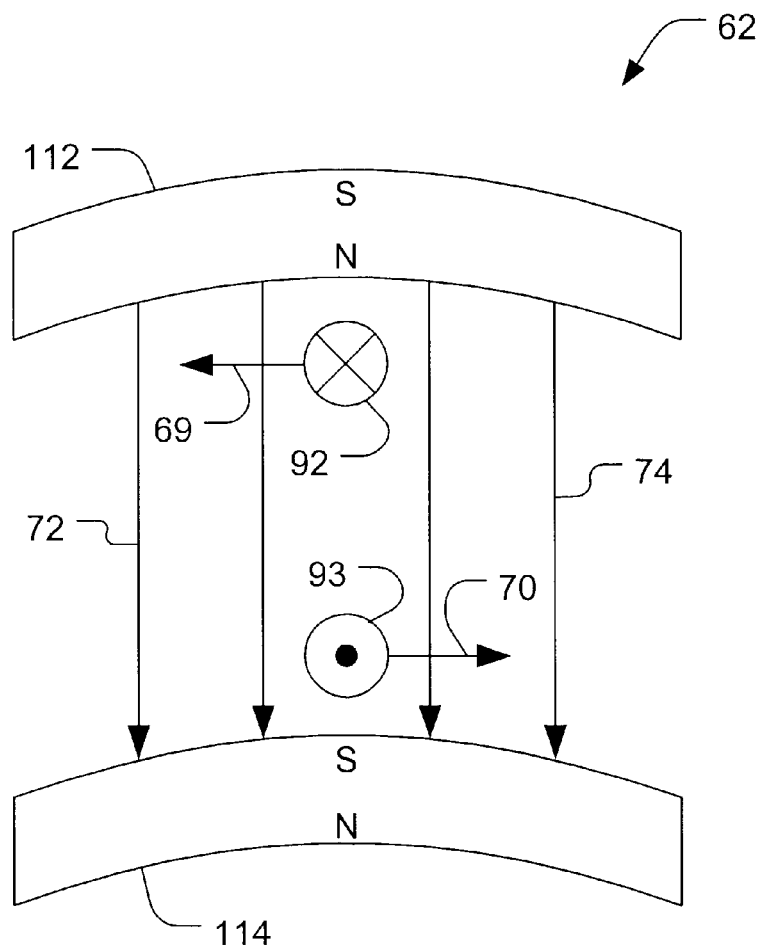
FIG. 7 is a schematic diagram showing another embodiment using more than one magnet.
Figure 7:
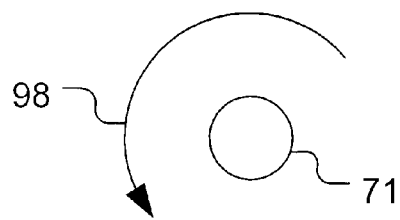

In another embodiment of the present invention which is shown schematically in FIG. 7, the magnetic field is provided by two unipolar magnets 112, 114, arranged with unlike poles facing each other. The active portions 92, 93, of the coil are disposed perpendicularly to the magnetic flux paths 72, 74, with the portions 92, 93, being at different radial separation from the pivot 71. A current flowing through the coil 68 thereby generates equal and opposite forces 69, 70, on the two active portions 92, 93, of the coil which is equivalent to the actuator 64 experiencing essentially only torque 98.

There may be physical imperfections in the voice coil motor which give rise to an unbalanced side-pull force on the actuator, but any such unbalanced forces will be less than what is produced by conventional voice coil motors. In this sense, the present invention provides for a "pure torque" voice coil motor that will contribute less to the vibration of the actuator.

The present invention provides an improved voice coil motor which reduces or eliminates the contribution of the voice coil motor to the vibration of the actuator. This means that it will be easier for the servo system to control the actuator, thus facilitating improved performance of the disc drive.

Alternatively, embodiments of the present invention may be described as follows:

An actuator 64 that is pivotally mounted to the housing 12 of a disc drive 10 is coupled to a coil 68 of a voice coil motor 62. The voice coil motor 62 further includes at least one magnet 66 providing a magnetic field substantially perpendicular to the axis 71 about which the actuator 64 is designed to rotate. The coil 68 has a first portion 92 and a second portion 93 that are substantially parallel to the axis 71. The first portion 92 and the second portion 93 are arranged at different radial distances from the axis 71. The first portion 92 and the second portion 93 are in the presence of the magnetic field such that when the coil 68 carries a current, substantially equal and opposite electromotive forces 69, 70 are generated at the first portion 92 and the second portion 93.

In one embodiment, the magnetic field is provided by a stationary unipolar magnet 66 located between the first portion 92 and the second portion 93. The magnetic field has radial magnetic flux paths 72, 74, cutting the first portion 92 and the second portion 93. Preferably, there is provided a yoke 80 configured to close the magnetic flux paths 72, 74. The yoke 80 can be formed with a first arm 82 adjacent the first portion 92 and a second arm 84 adjacent the second portion 93. Preferably, the magnetic flux paths 72, cutting the first portion 92 and the magnetic flux paths 74 cutting the second portion 94 are of substantially equal density and direction.

In a preferred embodiment, the magnet 66 is shaped with two opposing arcuate surfaces 76, 78, of substantially the same area and curvature. In an alternative embodiment, the magnet 66 is formed from at least two materials 100, 102, of different magnetic properties.

In yet another embodiment, the magnetic field is provided by a first stationary unipolar magnet 112 and a second stationary unipolar magnet 114 arranged with unlike poles facing each other, with the first portion 92 and the second portion 93 disposed between the magnets 112, 114, such that the first portion 92 and the second portion 93 are cut by radial magnetic flux paths 72, 74. There is preferably provided a yoke 80 having a first arm 82 adjacent the first magnet 112 and a second arm 84 adjacent the second magnet 114, such that the yoke 80 is configured to close the magnetic flux paths 74, 76. Preferably, the magnetic flux paths 74 cutting the first portion 92 and the magnetic flux paths 76 cutting the second portion 93 are of substantially equal density and direction.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts without departing from the scope and spirit of the present invention.

What is claimed is:

1. A voice coil motor for rotating an actuator about an axis, the voice coil motor comprising:
   at least one magnet for providing a magnetic field substantially perpendicular to the axis; and
   a coil configured to be coupled to the actuator, the coil having a first portion and a second portion that are configured to be substantially parallel to the axis and arranged at different radial distances from the axis when coupled to the actuator, the first portion and the second portions being in the presence of the magnetic field such that when the coil carries a current, substantially equal and opposite electromotive forces are generated at the first portion and the second portion.

2. The voice coil motor of claim 1 in which the at least one magnet comprises a stationary unipolar magnet located between the first portion and the second portion, the magnet providing the magnetic field with radial magnetic flux paths cutting the first portion and the second portion.

3. The voice coil motor of claim 2 further comprising a yoke having a first arm and a second arm, the first arm being adjacent the first portion and the second arm being adjacent the second portion, the yoke being configured to close the magnetic flux paths.

4. The voice coil motor of claim 2 in which the magnetic flux paths cutting the first portion and the magnetic flux paths cutting the second portion are of substantially equal density and direction.

5. The voice coil motor of claim 4 in which the magnet is shaped with two opposing arcuate surfaces of substantially the same area and curvature.

6. The voice coil motor of claim 4 in which the magnet is formed from at least two materials of different magnetic properties.

7. The voice coil motor of claim 1 in which the at least one magnet includes:
   a first stationary unipolar magnet; and
   a second stationary unipolar magnet, the first magnet and the second magnets having unlike poles facing each other, wherein the first portion and the second portion are disposed between the magnets, and wherein the magnets provide the magnetic field with radial magnetic flux paths cutting the first portion and the second portion.

8. The voice coil motor of claim 7 further comprising a yoke having a first arm and a second arm, the first arm being adjacent the first magnet and the second arm being adjacent the second magnet, the yoke being configured to close the magnetic flux paths.

9. The voice coil motor of claim 7 wherein the magnetic flux paths cutting the first portion and the magnetic flux paths cutting the second portion are of substantially equal density and direction.

10. A disc drive comprising:
    a housing;
    an actuator pivotally mounted to the housing for rotational movement about an axis; and
    a voice coil motor comprising:
       at least one magnet providing a magnetic field substantially perpendicular to the axis; and
       a coil coupled to the actuator, the coil having a first portion and a second portion that are substantially parallel to the axis and arranged at different radial distances from the axis, wherein the first portion and the second portions are in the presence of the magnetic field such that when the coil carries a current, substantially equal and opposite electromotive forces are generated at the first portion and the second portion.

11. The disc drive of claim 10 in which the at least one magnet includes a stationary unipolar magnet located between the first portion and the second portion, the magnet providing the magnetic field with radial magnetic flux paths cutting the first portion and the second portion.

12. The disc drive of claim 11 further comprising a yoke having a first arm and a second arm, the first arm being adjacent the first portion and the second arm being adjacent the second portion, the yoke being configured to close the magnetic flux paths.

13. The disc drive of claim 11 in which the magnetic flux paths cutting the first portion and the magnetic flux paths cutting the second portion are of substantially equal density and direction.

14. The disc drive of claim 13 in which the magnet is shaped with two opposing arcuate surfaces of substantially the same area and curvature.

15. The disc drive of claim 13 in which the magnet is formed from at least two materials of different magnetic properties.

16. The disc drive of claim 10 in which the at least one magnet includes:
    a first stationary unipolar magnet; and
    a second stationary unipolar magnet, the first magnet and the second magnets having unlike poles facing each other, wherein the first portion and the second portion are disposed between the magnets, and wherein the magnets provide the magnetic field with radial magnetic flux paths cutting the first portion and the second portion.

17. The disc drive of claim 16 further comprising a yoke having a first arm and a second arm, the first arm being adjacent the first magnet and the second arm being adjacent the second magnet, the yoke being configured to close the magnetic flux paths.

18. The disc drive of claim 16 in which the magnetic flux paths cutting the first portion and the magnetic flux paths cutting the second portion are of substantially equal density and direction.

19. A disc drive comprising:

a housing;

an actuator pivotally mounted to the housing; and means for rotating the actuator about an axis of rotation.

20. The disc drive of claim 19, the rotating means further comprising:

a coil having at least one portion extending in a direction substantially parallel to the axis of rotation.

21. The disc drive of claim 19, the rotating means further comprising:

at least one unipolar magnet fixed to the housing and a coil coupled to the actuator.

22. The disc drive of claim 19, the rotating means further comprising:

a magnet generating a magnetic field; and a yoke for closing magnetic flux paths generated by the magnetic field.

\* \* \* \* \*